(12) United States Patent
Yamaguchi et al.

(10) Patent No.: US 11,208,608 B2
(45) Date of Patent: Dec. 28, 2021

(54) REFRIGERATOR OIL AND WORKING FLUID COMPOSITION FOR REFRIGERATOR

(71) Applicant: ENEOS Corporation, Tokyo (JP)

(72) Inventors: Kentaro Yamaguchi, Tokyo (JP); Akira Tada, Tokyo (JP); Tatsuki Nakajima, Tokyo (JP); Takeshi Okido, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/343,226

(22) PCT Filed: Oct. 20, 2017

(86) PCT No.: PCT/JP2017/037994
§ 371 (c)(1),
(2) Date: Apr. 18, 2019

(87) PCT Pub. No.: WO2018/074584
PCT Pub. Date: Apr. 26, 2018

(65) Prior Publication Data
US 2020/0199476 A1    Jun. 25, 2020

(30) Foreign Application Priority Data
Oct. 20, 2016  (JP) .............................. JP2016-205957

(51) Int. Cl.
| C10M 107/28 | (2006.01) |
| C09K 5/04 | (2006.01) |
| C09K 5/08 | (2006.01) |
| C10N 20/02 | (2006.01) |
| C10N 30/02 | (2006.01) |
| C10N 40/30 | (2006.01) |

(52) U.S. Cl.
CPC ........... *C10M 107/28* (2013.01); *C09K 5/042* (2013.01); *C09K 5/045* (2013.01); *C09K 5/08* (2013.01); *C09K 2205/106* (2013.01); *C09K 2205/126* (2013.01); *C09K 2205/128* (2013.01); *C10M 2209/0806* (2013.01); *C10N 2020/02* (2013.01); *C10N 2030/02* (2013.01); *C10N 2040/30* (2013.01)

(58) Field of Classification Search
CPC ........ C10M 107/28; C10M 2209/0806; C10M 171/008; C09K 5/042; C09K 5/045; C09K 5/08; C09K 2205/106; C09K 2205/126; C09K 2205/128; C10N 2020/02; C10N 2030/02; C10N 2040/30
See application file for complete search history.

(56) References Cited

U.S. PATENT DOCUMENTS

2017/0218292 A1* 8/2017 Konno ..................... C09K 5/04

FOREIGN PATENT DOCUMENTS

| CN | 101379171 | 3/2009 | |
| JP | 4-275397 | 9/1992 | |
| JP | 5-209181 | 8/1993 | |
| JP | 2001-107066 | 4/2001 | |
| JP | 2007-204568 | 8/2007 | |
| JP | 2011-513538 | 4/2011 | |
| JP | 2012-530186 | 11/2012 | |
| JP | 2016-98284 | 5/2016 | |
| JP | 2016098284 A * | 5/2016 | |
| JP | 6371202 B2 * | 8/2018 | |
| TW | 201546261 | 12/2016 | |
| WO | 2009/108547 | 9/2009 | |
| WO | 2010/148003 | 12/2010 | |
| WO | 2015/178233 | 11/2015 | |
| WO | WO-2015178233 A1 * | 11/2015 | .......... C10M 107/28 |

OTHER PUBLICATIONS

International Search Report issued in International Bureau of WIPO Patent Application No. PCT/JP2017/037994, dated Nov. 21, 2017, English translation.
International Preliminary Report on Patentability issued in International Bureau of WIPO Patent Application No. PCT/JP2017/037994, dated May 2, 2019, English translation.

* cited by examiner

*Primary Examiner* — James C Goloboy
(74) *Attorney, Agent, or Firm* — Greenblum & Bernstein, P.L.C.

(57) ABSTRACT

In an aspect, the present invention provides a refrigerating machine oil comprising a poly(meth)acrylate as a base oil, wherein the poly(meth)acrylate comprises a hydrogenated poly(meth)acrylate, a content of a unit having a carbon-carbon double bond present at a terminal in the poly(meth)acrylate is 6% by mole or less relative to total units constituting the poly(meth)acrylate, and a kinematic viscosity at 40° C. of the hydrogenated poly(meth)acrylate is 1 to 1000 mm2/s, the refrigerating machine oil being used with a refrigerant comprising a refrigerant selected from difluoromethane, a mixture of difluoromethane and pentafluoroethane, a mixture of difluoromethane, pentafluoroethane, and 1, 1, 1, 2-tetrafluoroethane, a mixture of pentafluoroethane, 1, 1, 1, 2-tetrafluoroethane, and 1, 1, 1-trifluoroethane, an unsaturated hydrofluorocarbon, a hydrocarbon, and carbon dioxide.

19 Claims, No Drawings

REFRIGERATOR OIL AND WORKING FLUID COMPOSITION FOR REFRIGERATOR

TECHNICAL FIELD

The present invention relates to a refrigerating machine oil and a working fluid composition for a refrigerating machine.

BACKGROUND ART

Due to the recent problem of ozone layer destruction, CFC (chlorofluorocarbon) and HCFC (hydrochlorofluorocarbon) conventionally used as refrigerants for refrigerating machines are subject to regulation, and HFC (hydrofluorocarbon) is becoming increasingly used as a refrigerant in place of CFC and HCFC. Further, the development of refrigerants having a lower global warming potential (GWP) than HFC refrigerants is being pursued.

Although a hydrocarbon oil such as mineral oil or alkylbenzene has been suitably used as a refrigerating machine oil in a conventional case where CFC or HCFC is a refrigerant, different refrigerating machine oils need to be developed for different refrigerants since a refrigerating machine oil, depending on the type of a refrigerant coexisting with the refrigerating machine oil, exhibits unexpected behaviors in terms of the compatibility with the refrigerant, the lubricity, the viscosity upon dissolution of the refrigerant, the thermal/chemical stability, and the like.

For example, Patent Literature 1 discloses a refrigerating machine oil superior both in compatibility with refrigerants such as freon-134a and in lubrication performance, the refrigerating machine oil containing a specified acrylic acid ester polymer as a main component.

CITATION LIST

Patent Literature

Patent Literature 1: Japanese Unexamined Patent Publication No. H4-275397

SUMMARY OF INVENTION

Technical Problem

However, when the refrigerating machine oil described in Patent Literature 1 which contains an acrylic acid ester polymer as a main component is used, there is still room for improvement in terms of compatibility with certain refrigerants.

The present invention therefore aims to provide a refrigerating machine oil superior in compatibility with specified refrigerants and a working fluid composition for a refrigerating machine.

Solution to Problem

In an aspect, the present invention provides a refrigerating machine oil comprising a poly(meth)acrylate as a base oil, wherein the poly(meth)acrylate comprises a hydrogenated poly(meth)acrylate, a content of a unit having a carbon-carbon double bond present at a terminal in the poly(meth)acrylate is 6% by mole or less relative to total units constituting the poly(meth)acrylate, and a kinematic viscosity at 40° C. of the hydrogenated poly(meth)acrylate is 1 to 1000 mm²/s, the refrigerating machine oil being used with a refrigerant comprising a refrigerant selected from difluoromethane, a mixture of difluoromethane and pentafluoroethane, a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, a hydrocarbon, and carbon dioxide.

Further, in another aspect, the present invention provides a working fluid composition for a refrigerating machine, comprising: a refrigerating machine oil comprising a poly(meth)acrylate as a base oil, wherein the poly(meth)acrylate comprises a hydrogenated poly(meth)acrylate, a content of a unit having a carbon-carbon double bond present at a terminal in the poly(meth)acrylate is 6% by mole or less relative to total units constituting the poly(meth)acrylate, and a kinematic viscosity at 40° C. of the hydrogenated poly(meth)acrylate is 1 to 1000 mm²/s; and a refrigerant comprising a refrigerant selected from difluoromethane, a mixture of difluoromethane and pentafluoroethane, a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, a hydrocarbon, and carbon dioxide.

In each of the above aspects, the refrigerant may comprise a refrigerant selected from a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, and a hydrocarbon, and may comprise an unsaturated hydrofluorocarbon.

In each of the above aspects, the hydrogenated poly(meth)acrylate may have a structural unit represented by the following formula (1).

wherein $R^1$, $R^2$, and $R^3$ each independently represent a hydrogen atom or a hydrocarbon group, and $R^4$ represents a hydrocarbon group or an oxygen-containing organic group.

The number of carbon atoms in the hydrocarbon group represented by $R^4$ in the formula (1) may be 1 to 10. The hydrocarbon group represented by $R^4$ in the formula (1) may be an alkyl group having 1 to 4 carbon atoms or may be an alkyl group having 2 carbon atoms.

Advantageous Effects of Invention

According to the present invention, a refrigerating machine oil superior in compatibility with specified refrigerants and a working fluid composition for a refrigerating machine can be provided.

DESCRIPTION OF EMBODIMENTS

Hereinafter, an embodiment of the present invention will be described in detail.

A refrigerating machine oil according to the present embodiment comprises a poly(meth)acrylate as a base oil. The poly(meth)acrylate comprises at least a hydrogenated poly(meth)acrylate and may further comprise a non-hydrogenated poly(meth)acrylate. In the present specification, a poly(meth)acrylate subjected to hydrogenation process is referred to as "hydrogenated poly(meth)acrylate", a poly (meth)acrylate not subjected to hydrogenation process is referred to as "non-hydrogenated poly(meth)acrylate", and a poly(meth)acrylate subjected to hydrogenation process and a poly(meth)acrylate not subjected to hydrogenation process are collectively and simply referred to as "poly(meth)acrylate".

The poly(meth)acrylate has, for example, a structural unit represented by the following formula (1):

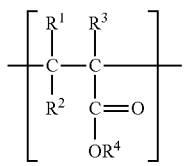
(1)

wherein $R^1$, $R^2$, and $R^3$ each independently represent a hydrogen atom or a hydrocarbon group, and $R^4$ represents a hydrocarbon group or an oxygen-containing organic group.

The hydrocarbon groups represented by $R^1$, $R^2$, and $R^3$ in the formula (1) may be, for example, alkyl groups. The number of carbon atoms in the hydrocarbon groups or alkyl groups is preferably 1 to 8, more preferably 1 to 5, and even more preferably 1 to 3. It is preferable that, in the formula (1), $R^1$ and $R^2$ each be a hydrogen atom and $R^3$ be a hydrogen atom or a methyl group.

The hydrocarbon group represented by $R^4$ in the formula (1) may be, for example, an alkyl group. The number of carbon atoms in the hydrocarbon group or alkyl group is preferably 1 to 10, more preferably 1 to 5, even more preferably 1 to 4, and particularly preferably 2. The average number of carbon atoms in the hydrocarbon groups represented by $R^4$ in the total structural units constituting the poly(meth)acrylate is preferably 1 to 10, more preferably 1 to 5, even more preferably 1 to 4, and particularly preferably 2. Examples of the oxygen-containing organic group represented by $R^4$ include a linear or branched hydrocarbon group containing an oxygen atom forming an ether bond and a hydrocarbon group having a glycidyl group.

—$OR^4$ in the formula (1) may be, for example, a structure represented by the following formula (2):

wherein $R^5$ represents a divalent hydrocarbon group or a divalent ether bond oxygen-containing hydrocarbon group, $R^6$ represents a hydrocarbon group, and m represents an integer of 0 or more. When m is 2 or more, the plurality of $R^5$ groups may be the same or different from each other.

The number of carbon atoms in the divalent hydrocarbon group or ether bond oxygen-containing hydrocarbon group represented by $R^5$ in the formula (2) is preferably 1 to 10, more preferably 1 to 5, and even more preferably 1 to 3. The divalent ether bond oxygen-containing hydrocarbon group may be, for example, a hydrocarbon group having an oxygen atom forming an ether bond in a side chain.

$R^6$ in the formula (2) is preferably a hydrocarbon group having 1 to 20 carbon atoms. Examples of the hydrocarbon group include an alkyl group, a cycloalkyl group, a phenyl group, an aryl group, and an arylalkyl group. This hydrocarbon group is preferably an alkyl group and more preferably an alkyl group having 1 to 5 carbon atoms.

m in the formula (2) is preferably an integer of 0 or more, more preferably 1 or more, and is preferably an integer of 20 or less, more preferably 10 or less, even more preferably 5 or less. The average of m in the total structural units constituting the poly(meth)acrylate is preferably 0 to 10.

The poly(meth)acrylate may be a homopolymer constituted by one structural unit selected from structural units represented by the formula (1), may be a copolymer constituted by two or more structural units selected from structural units represented by the formula (1), or may be a copolymer constituted by a structural unit represented by the formula (1) and another structural unit. The copolymer may be either a block copolymer or a random copolymer.

When the poly(meth)acrylate is a copolymer, the copolymer preferably has at least one structural unit selected from structural units represented by the formula (1) wherein $R^4$ is an alkyl group having 1 to 4 carbon atoms. This copolymer may have two or more structural units selected from structural units represented by the formula (1) wherein $R^4$ is an alkyl group having 1 to 4 carbon atoms, or may have one or more structural units selected from structural units represented by the formula (1) wherein $R^4$ is an alkyl group having 1 to 4 carbon atoms and one or more structural units selected from structural units represented by the formula (1) wherein $R^4$ is an alkyl group having 5 to 8 carbon atoms or an oxygen-containing organic group. This copolymer particularly preferably has a structural unit represented by the formula (1) wherein $R^4$ is an alkyl group having 2 carbon atoms (i.e., an ethyl group), because in this case the copolymer is especially superior in the compatibility with specified refrigerants. The content of the structural unit represented by the formula (1) wherein $R^4$ is an alkyl group having 1 to 4 carbon atoms (particularly preferably an ethyl group) is preferably 30% by mole or more, more preferably 50% by mole or more, even more preferably 70% by mole or more, particularly preferably 80% by mole or more, and most preferably 90% by mole or more, based on the total amount of the structural units constituting the copolymer.

Among the copolymers mentioned above, for example, the copolymers (A) to (G) listed below are suitable. $R^1$ to $R^4$ in (A) to (G) respectively refer to $R^1$ to $R^4$ in the formula (1).

(A) A copolymer having a structural unit in which $R^1$ to $R^3$ each are a hydrogen atom and $R^4$ is an ethyl group and a structural unit in which $R^1$ to $R^3$ each are a hydrogen atom and $R^4$ is a n-butyl group.

(B) A copolymer having a structural unit in which $R^1$ to $R^3$ each are a hydrogen atom and $R^4$ is an ethyl group, a structural unit in which $R^1$ to $R^3$ each are a hydrogen atom and $R^4$ is a n-butyl group, and a structural unit in which $R^1$ to $R^3$ each are a hydrogen atom and $R^4$ is an i-butyl group (2-methylpropyl group).

(C) A copolymer having a structural unit in which $R^1$ to $R^3$ each are a hydrogen atom and $R^4$ is an ethyl group and a structural unit in which $R^1$ to $R^3$ each are a hydrogen atom and $R^4$ is a propyl group.

(D) A copolymer having a structural unit in which $R^1$ to $R^3$ each are a hydrogen atom and $R^4$ is an ethyl group and a structural unit in which $R^1$ to $R^3$ each are a hydrogen atom and $R^4$ is an i-octyl group (e.g., 2-ethylhexyl group).

(E) A copolymer having a structural unit in which $R^1$ and $R^2$ each are a hydrogen atom and $R^3$ and $R^4$ are methyl groups and a structural unit in which $R^1$ to $R^3$ each are a hydrogen atom and $R^4$ is an i-octyl group (e.g., 2-ethylhexyl group).

(F) A copolymer having a structural unit in which $R^1$ to $R^3$ each are a hydrogen atom and $R^4$ is an ethyl group and a structural unit in which $R^1$ and $R^2$ each are a hydrogen atom, $R^3$ is a methyl group, and $R^4$ is a glycidyl group.

(G) A copolymer having a structural unit in which $R^1$ to $R^3$ each are a hydrogen atom and $R^4$ is an i-butyl group (2-methylpropyl group) and a structural unit in which $R^1$ and $R^2$ each are a hydrogen atom, $R^3$ is a methyl group, and $R^4$ is a methoxyethyl group.

The hydrogenated poly(meth)acrylate is one obtained by subjecting a poly(meth)acrylate (non-hydrogenated poly(meth)acrylate) having carbon-carbon double bonds at terminals of the main chain to hydrogenation process, and has a structure in which part or all of the carbon-carbon double bonds at the terminals of the main chain are hydrogenated. By hydrogenation process of the terminal carbon-carbon double bonds of the poly(meth)acrylate, compatibility with many specified refrigerants is improved. The hydrogenated poly(meth)acrylate has, in addition to the poly(meth)acrylate structure as described above, at least one of a terminal structure represented by the following formula (3) and a terminal structure represented by the following formula (4) and preferably has both of the terminal structures:

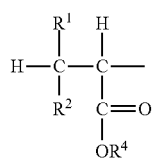

(3)

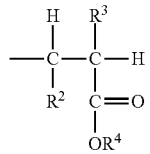

(4)

wherein $R^1$ to $R^4$ are respectively as defined for $R^1$ to $R^4$ in the formula (1).

The content of the unit (structural unit) having a carbon-carbon double bond present at a terminal (this bond will be also referred to as "terminal double bond" hereinafter) of the poly(meth)acrylate is 6% by mole or less, preferably 3% by mole or less, more preferably 1% by mole or less, even more preferably 0.5% by mole or less, and particularly preferably 0.01% by mole or less, relative to the total units constituting the poly(meth)acrylate, from the viewpoint of the superiority in compatibility with specified refrigerants. However, the content of the unit having a terminal double bond may be 0.1% by mole or more or 1% by mole or more relative to the total units constituting the poly(meth)acrylate as long as the refrigerating machine oil has a desired refrigerant compatibility.

The unit having a carbon-carbon double bond present at a terminal in the poly(meth)acrylate refers to a unit represented by the following formula (5) or formula (6). Examples of this unit include a vinylidene group-containing unit represented by the formula (5) wherein $R^1$ and $R^2$ each are hydrogen or a vinylene group-containing unit represented by the formula (6) wherein either $R^1$ or $R^2$ and $R^3$ each are hydrogen:

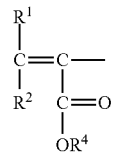

(5)

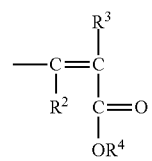

(6)

wherein $R^1$ to $R^4$ are respectively as defined for $R^1$ to $R^4$ in the formula (1).

The content of the unit having a terminal double bond in the poly(meth)acrylate is determined by calculating the molar ratio of the unit having a terminal double bond to the total units as an average value on the basis of a result of $^1$H-NMR measurement, namely on the basis of the relationship between the intensity of the peak attributed to the hydrogen atoms bonded to the carbon atoms forming the terminal double bond and the intensity of the peak attributed to the hydrogen atom(s) bonded to the carbon atom nearest to the single-bonded oxygen atom of the ester structure (i.e., the peak attributed to $H_n$ in —O—$CH_nR_{3-n}$, wherein n is an integer of 1 to 3 and —$CH_nR_{3-n}$ corresponds to $R^4$ in the formula (1)).

More specifically, the content V of the unit having a terminal double bond in the poly(meth)acrylate is calculated, for example, by the following equation.

$$V = Hv/Hm \times 100$$

V: The content (mol %) of the unit having a terminal double bond in the poly(meth)acrylate Hv: The integral of the peak attributed to the hydrogen atoms bonded to the carbon atoms forming the terminal double bond in the poly(meth)acrylate/2 (e.g., the integral of a peak attributed to hydrogen atoms included in a vinylidene group and a vinylene group/2)

Hm: The integral of the peak attributed to the hydrogen atom(s) bonded to the carbon atom nearest to the single-bonded oxygen atom of the ester structure in the poly(meth)acrylate (e.g., the peak attributed to $H_n$ in —O—$CH_nR_{3-n}$, wherein n is an integer of 1 to 3 and —$CH_nR_{3-n}$ corresponds to $R^4$ in the formula (1))/n The peak attributed to the hydrogen atoms bonded to the carbon atoms forming the terminal double bond in the poly(meth)acrylate appears, for example, at around 5.5 to 6.2 ppm, and the peak attributed to the hydrogen atom(s) bonded to the carbon atom nearest to the single-bonded oxygen atom of the ester structure in the poly(meth)acrylate appears, for example, at around 4 ppm; however, it is needless to say that the positions of these peaks need to be confirmed for every measurement because the positions of the peaks may be shifted according to the structure of the measurement object. The $^1$H-NMR measurement was performed using VNMRS 600 MHz, an NMR spectrometer manufactured by Agilent Technologies Inc., as an instrument and using deuterated chloroform as a solvent, and another instrument may be used as long as the same result can be obtained.

The amount of the remaining monomer contained in the hydrogenated poly(meth)acrylate is preferably 5% by mass or less, 2% by mass or less, or 1% by mass or less, more preferably 0.5% by mass or less, 0.2% by mass or less, or 0.1% by mass or less, even more preferably 0.05% by mass or less, and particularly preferably less than 0.01% by mass, relative to the total amount of the hydrogenated poly(meth) acrylate, from the viewpoint of the superiority in, for example, thermal stability.

The amount of the remaining monomer can be measured, for example, by gas chromatography using the following instrument and conditions, and may be measured using different conditions as long as the same result can be obtained.

Instrument: SHIMADZU GC-2014
Column: Inert Cap 1 (length: 30 m, inner diameter: 0.25 mm, film thickness: 0.25 μm)
Injection amount: 1.0 μL
Way of injection: Sprit ratio of 15.0
Injection port temperature: 300° C.
Oven: 40° C. (5 min)-10° C./min-310° C. (10 min)-330° C. (8 min)
Carrier gas: He, linear velocity: 30.8 cm/s
Detector: FID, 350° C.

The non-hydrogenated poly(meth)acrylate can be produced, for example, by a known method as described in International Publication No. WO 01/083619. In this case, the various properties of the refrigerating machine oil can be controlled to desired levels by appropriately choosing the type of the monomer used as a starting material, the type of the initiator, the proportions of the structural units in the copolymer, etc.

The hydrogenated poly(meth)acrylate can be obtained by hydrogenating the thus obtained non-hydrogenated poly (meth)acrylate by a known method such as a method described in Japanese Unexamined Patent Publication No. 2016-098284. The method for the hydrogenation is not particularly limited and may be, for example, any of the following methods.

(I) A method in which hydrogenation is performed using a homogeneous catalyst of the so-called Ziegler type composed of a combination of an organic acid salt or acetylacetone salt of Ti, Co, Ni, or the like and an organometal compound of Li, Mg, Al, Sn, or the like.
(II) A method in which hydrogenation is performed using a supported noble metal catalyst composed of a noble metal such as Pd, Pt, Ru, or Rh supported on a support such as carbon, alumina, silica-alumina, or diatomite.
(III) A method in which hydrogenation is performed using a solid catalyst employing a base metal such as Ni.
(IV) A method in which hydrogenation is performed using a metal complex catalyst based on a noble metal such as Rh or Ru.
These methods may be used with appropriate modifications made as necessary.

More specifically, the hydrogenation catalyst is preferably a titanocene compound, a reducing organometal compound, or a mixture of a titanocene compound and a reducing organometal compound. Examples of the titanocene compound include compounds having at least one ligand having a (substituted) cyclopentadienyl skeleton, an indenyl skeleton, or a fluorenyl skeleton, such as biscyclopentadienyl titanium dichloride and monopentamethylcyclopentadienyl titanium trichloride. Examples of the reducing organometal compound include organic alkali metal compounds such as organolithium, organomagnesium compounds, orgnaoaluminum compounds, organoboron compounds, and organozinc compounds.

The hydrogen addition reaction (hydrogenation reaction) is carried out, for example, in a temperature range of 0 to 200° C., preferably 30 to 150° C. The hydrogen pressure in the hydrogenation reaction is, for example, 0.1 to 15 MPa, preferably 0.2 to 10 MPa, and more preferably 0.3 to 5 MPa. The time of the hydrogenation reaction is, for example, 3 minutes to 10 hours and preferably 10 minutes to 5 hours. The hydrogenation reaction can be carried out by any of a batch process, a continuous process, and a combination thereof.

The number-average molecular weight (Mn) of the hydrogenated poly(meth)acrylate is preferably 300 or more, more preferably 400 or more, even more preferably 500 or more, and particularly preferably 600 or more and is preferably 3000 or less, more preferably 2000 or less, even more preferably 1500 or less, and particularly preferably 1000 or less. When the number-average molecular weight is 300 or more, lubricity (in particular antiwear property) in the coexistence of a specified refrigerant is improved. When the number-average molecular weight is 3000 or less, the compatibility with specified refrigerants is further improved.

In the hydrogenated poly(meth)acrylate, the ratio (Mw/Mn) between the weight-average molecular weight (Mw) and the number-average molecular weight (Mn) is preferably 1.10 or more, more preferably 1.11 or more, even more preferably 1.12 or more, and particularly preferably 1.13 or more and is preferably 2.00 or less, more preferably 1.90 or less, even more preferably 1.80 or less, and particularly preferably 1.70 or less. When Mw/Mn is 1.10 or more, the compatibility with specified refrigerants is improved. When Mw/Mn is 2.00 or less, poor lubrication of a refrigerant compressor and disturbance of heat exchange in an evaporator can be prevented. The weight-average molecular weight (Mw) of the hydrogenated poly(meth)acrylate is chosen as appropriate in such a way that Mn and Mw/Mn satisfy the above requirements.

The weight-average molecular weight (Mw), the number-average molecular weight (Mn), and the ratio (Mw/Mn) between weight-average molecular weight (Mw) and the number-average molecular weight (Mn) in the present invention refer to Mw, Mn, and Mw/Mn (polystyrene (standard sample) equivalents) obtained by GPC analysis. Mw, Mn, and Mw/Mn can be measured as follows, for example.

Tetrahydrofuran is used as a solvent, and a solution having a sample concentration of 1% by mass is prepared by dilution. The sample solution is analyzed using a GPC instrument (Alliance 2695, Waters Corporation). The analysis is carried out at a solvent flow rate of 1 ml/min using a column with an analyzable molecular weight of 100 to 10000 and a refractive index detector. A calibration curve is separately prepared by determining the relationship between the column retention time and the molecular weight using a polystyrene standard the molecular weight of which is clearly known, and the molecular weight is determined from the obtained retention time.

The average degree of polymerization of the hydrogenated poly(meth)acrylate is not particularly limited as long as the effect of the present invention is obtained. From the viewpoint of achieving a kinematic viscosity appropriate for use as a base oil of the refrigerating machine oil, the average degree of polymerization is preferably 3 or more, more preferably 5 or more, and even more preferably 6 or more, and is preferably 20 or less, more preferably 15 or less, and even more preferably 10 or less. From the same viewpoint, the average degree of polymerization of the hydrogenated poly(meth)acrylate is preferably 3 to 20, 3 to 15, 3 to 10, 5 to 20, 5 to 15, 5 to 10, 6 to 20, 6 to 15, or 6 to 10. The average degree of polymerization as described herein is obtained, for example, as a value calculated by dividing the number-average molecular weight (Mn) obtained through the above GPC analysis by an apparent average molecular weight determined depending on the molar ratio between the constituent monomers.

The flash point of the hydrogenated poly(meth)acrylate is preferably 195° C. or higher, more preferably 200° C. or higher, and even more preferably 205° C. or higher. The flash point in the present invention refers to that measured according to JIS K 2265-4:2007 "Determination of flash point—Part 4: Cleveland open cup method".

The kinematic viscosity at 40° C. of the hydrogenated poly(meth)acrylate is 1 to 1000 mm$^2$/s, preferably 10 mm$^2$/s or more, more preferably 20 mm$^2$/s or more, even more preferably 30 mm$^2$/s or more, particularly preferably 50 mm$^2$/s or more, and most preferably 70 mm$^2$/s or more, and is preferably 900 mm$^2$/s or less, more preferably 500 mm$^2$/s or less, even more preferably 400 mm$^2$/s or less, and particularly preferably 300 mm$^2$/s or less. It is more preferable that the kinematic viscosity at 40° C. be 10 mm$^2$/s or more, because in this case the lubricity and the hermeticity of a compressor tend to be improved. When the kinematic viscosity at 40° C. is more than 1000 mm$^2$/s, the effect of the hydrogenation tends to be relatively small, while when the kinematic viscosity at 40° C. is 900 mm$^2$/s or less, the improvement effect on the compatibility with refrigerants is large, and poor lubrication of a refrigerant compressor and disturbance of heat exchange in an evaporator can be prevented. The kinematic viscosity at 40° C. of the hydrogenated poly(meth)acrylate may be 10 to 900 mm$^2$/s, 10 to 500 mm$^2$/s, 10 to 400 mm$^2$/s, 10 to 300 mm$^2$/s, 20 to 900 mm$^2$/s, 20 to 500 mm$^2$/s, 20 to 400 mm$^2$/s, 20 to 300 mm$^2$/s, 30 to 900 mm$^2$/s, 30 to 500 mm$^2$/s, 30 to 400 mm$^2$/s, 30 to 300 mm$^2$/s, 50 to 900 mm$^2$/s, 50 to 500 mm$^2$/s, 50 to 400 mm$^2$/s, 50 to 300 mm$^2$/s, 70 to 900 mm$^2$/s, 70 to 500 mm$^2$/s, 70 to 400 mm$^2$/s, or 70 to 300 mm$^2$/s. The kinematic viscosity at 100° C. of the hydrogenated poly(meth)acrylate is preferably 1 mm$^2$/s or more, more preferably 2 mm$^2$/s or more, and even more preferably 3 mm$^2$/s or more, and is preferably 50 mm$^2$/s or less, more preferably 40 mm$^2$/s or less, and even more preferably 30 mm$^2$/s or less. When the kinematic viscosity at 100° C. is 1 mm$^2$/s or more, the lubricity in the coexistence of a refrigerant are improved. When the kinematic viscosity at 100° C. is 50 mm$^2$/s or less, poor lubrication of a refrigerant compressor and disturbance of heat exchange in an evaporator can be prevented.

The viscosity index of the hydrogenated poly(meth)acrylate is preferably 80 or more, more preferably 90 or more, and even more preferably 100 or more, and is preferably 200 or less, more preferably 180 or less, and even more preferably 150 or less. When the viscosity index is 80 or more, the lubricity (in particular antiwear property) at a high temperature in the coexistence of a specified refrigerant are improved. When the viscosity index is 200 or less, the lubricity (in particular antiwear property) at a low temperature in the coexistence of a specified refrigerant is improved.

The kinematic viscosities at 40° C. and 100° C. and the viscosity index in the present invention refer to those measured according to JIS K-2283:1993.

The pour point of the hydrogenated poly(meth)acrylate is preferably −10° C. or lower and more preferably −20° C. or lower, and is preferably −50° C. or higher. The use of a hydrogenated poly(meth)acrylate having a pour point of −10° C. or lower tends to prevent the refrigerating machine oil from being solidified at low temperature in a refrigerant circulation system. The pour point in the present invention refers to that measured according to JIS K 2269:1987.

The refrigerating machine oil may comprise the hydrogenated poly(meth)acrylate alone or may further comprise a base oil other than the hydrogenated poly(meth)acrylate and/or an additive. The amount of the hydrogenated poly(meth)acrylate contained in the refrigerating machine oil is, for example, 30% by mass or more or 40% by mass or more and preferably 50% by mass or more, more preferably 70% by mass or more, even more preferably 80% by mass or more, and particularly preferably 90% by mass or more, based on the total amount of the refrigerating machine oil The poly(meth)acrylate used as a base oil may consist only of the hydrogenated poly(meth)acrylate or may consist of the hydrogenated poly(meth)acrylate and a non-hydrogenated poly(meth)acrylate. The non-hydrogenated poly(meth)acrylate may have a structure and properties similar to the above-described structure and properties (excluding those related to the terminal double bond) of the hydrogenated poly(meth)acrylate. That is, in the foregoing description of the structure and properties (excluding those related to the terminal double bond), the term "hydrogenated poly(meth)acrylate" is interchangeable with the term "non-hydrogenated poly(meth)acrylate" and is also interchangeable with the term "poly(meth)acrylate". The amount of the hydrogenated poly(meth)acrylate contained in the poly(meth)acrylate is, for example, 30% by mass or more or 40% by mass or more, and preferably 50% by mass or more, more preferably 70% by mass or more, even more preferably 80% by mass or more, and particularly preferably 90% by mass or more, based on the total amount of the poly(meth)acrylate.

As the base oil other than the hydrogenated poly(meth)acrylate, there can be used not only non-hydrogenated poly(meth)acrylates, but also hydrocarbon oils such as a mineral oil, an olefin polymer, a naphthalene compound, and an alkylbenzene and synthetic oils (oxygenated oils) composed of a compound containing oxygen as a constituent element, such as ester base oils (e.g., monoester, diester, and polyol ester), polyalkylene glycol, polyvinyl ether, ketone, polyphenyl ether, silicone, polysiloxane, and perfluoroether. Polyol ester, polyalkylene glycol, and polyvinyl ether are preferably used as oxygenated oils.

The content of the base oil is preferably 80% by mass or more, more preferably 90% by mass or more, and even more preferably 95% by mass or more, based on the total amount of the refrigerating machine oil.

Examples of the additive include an acid scavenger, an antioxidant, an extreme-pressure agent, an oiliness agent, an antifoaming agent, a metal deactivator, an antiwear agent, a viscosity index improver, a pour point depressant, a detergent-dispersant, a friction modifier, and a rust inhibitor. The content of the additive may be, for example, 5% by mass or less or 2% by mass or less, based on the total amount of the refrigerating machine oil.

The refrigerating machine oil preferably further comprises an acid scavenger among the above-mentioned additives from the viewpoint of improving the thermal/chemical stability. Examples of the acid scavenger include an epoxy compound and a carbodiimide compound.

Examples of the epoxy compound include, but are not limited to, glycidyl ether epoxy compounds, glycidyl ester epoxy compounds, oxirane compounds, alkyloxirane compounds, alicyclic epoxy compounds, epoxidized fatty acid monoesters, and epoxidized vegetable oils. One of these epoxy compounds may be used alone, or two or more thereof may be used in combination.

The refrigerating machine oil preferably further comprises an antiwear agent among the above-mentioned additives. Examples of suitable antiwear agents include phosphoric acid esters, thiophosphoric acid esters, sulfide compounds, and zinc dialkyldithiophosphates. Among phosphoric acid esters, triphenyl phosphate (TPP) and tricresyl phosphate (TCP) are preferred. Among thiophosphoric acid esters, triphenyl phosphorothionate (TPPT) is preferred. As for sulfide compounds, monosulfide compounds are preferred in that they can ensure the stability of the refrigerating machine oil and reduce alteration of copper used in a large quantity in the interior of a refrigerating machine.

The refrigerating machine oil preferably further comprises an antioxidant among the above-mentioned additives. Examples of the antioxidant include phenol antioxidants such as di-tert-butyl-p-cresol and amine antioxidants such as alkyldiphenylamine. The refrigerating machine oil preferably comprises a phenol compound as an antioxidant in a content of 0.02% by mass or more and 0.5% by mass or less, based on the total amount of the refrigerating machine oil.

The refrigerating machine oil preferably further comprises a friction modifier, an extreme-pressure agent, a rust inhibitor, a metal deactivator, and an antifoaming agent among the above-mentioned additives. Examples of the friction modifier include aliphatic amines, aliphatic amides, aliphatic imides, alcohols, esters, amine salts of phosphoric acid esters, and amine salts of phosphorous acid esters. Examples of the extreme-pressure agent include sulfurized olefins and sulfurized fats and oils. Examples of the rust inhibitor include esters or partial esters of alkenyl succinic acids. Examples of the metal deactivator include benzotriazole and benzotriazole derivatives. Examples of the antifoaming agent include silicone compounds and polyester compounds.

The kinematic viscosity at 40° C. of the refrigerating machine oil is not particularly limited and is preferably 3 mm$^2$/s or more, more preferably 4 mm$^2$/s or more, and even more preferably 5 mm$^2$/s or more, and is preferably 1000 mm$^2$/s or less, more preferably 500 mm$^2$/s or less, and even more preferably 400 mm$^2$/s or less. The kinematic viscosity at 100° C. of the refrigerating machine oil is not particularly limited and is preferably 1 mm$^2$/s or more, more preferably 2 mm$^2$/s or more, and even more preferably 3 mm$^2$/s or more, and is preferably 100 mm$^2$/s or less, more preferably 50 mm$^2$/s or less, and even more preferably 30 mm$^2$/s or less.

The moisture content in the refrigerating machine oil is not particularly limited and is preferably 500 ppm or less, more preferably 300 ppm or less, and even more preferably 200 ppm or less, based on the total amount of the refrigerating machine oil.

The acid value of the refrigerating machine oil is not particularly limited and is preferably 1.0 mg KOH/g or less and more preferably 0.1 mg KOH/g or less. The acid value in the present invention refers to that measured according to JIS K 2501:2003 "Petroleum products and lubricants-Determination of neutralization number".

The ash content of the refrigerating machine oil is not particularly limited and is preferably 100 ppm or less and more preferably 50 ppm or less. The ash content in the present invention refers to that measured according to JIS K 2272:1998 "Crude oil and petroleum products-Determination of ash and sulfated ash".

The refrigerating machine oil according to the present embodiment is used with a refrigerant comprising a refrigerant selected from difluoromethane, a mixture of difluoromethane and pentafluoroethane, a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, a hydrocarbon, and carbon dioxide.

A working fluid composition for a refrigerating machine according to the present embodiment comprises the refrigerating machine oil described above and a refrigerant comprising a refrigerant selected from difluoromethane, a mixture of difluoromethane and pentafluoroethane, a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, a hydrocarbon, and carbon dioxide.

The refrigerant preferably comprises a refrigerant selected from a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, and a hydrocarbon and more preferably comprises an unsaturated hydrofluorocarbon, from the viewpoint of high likelihood of achieving superior compatibility in use with the refrigerating machine oil according to the present embodiment.

In mixtures of difluoromethane (R32) and pentafluoroethane (R125), the mass ratio (R32/R125) may be, for example, 40 to 70/60 to 30. Among the mixtures, a mixture in which the mass ratio (R32/R125) is 60/40, a mixture in which the mass ratio is 50/50 (R410A), and a mixture in which the mass ratio is 45/55 (R410B) are suitably used.

In mixtures of difluoromethane (R32), pentafluoroethane (R125), and 1,1,1,2-tetrafluoroethane (R134a), the mass ratio (R32/R125/R134a) may be, for example, 15 to 35/5 to 40/40 to 70. Among the mixtures, a mixture in which the mass ratio (R32/R125/R134a) is 30/10/60, a mixture in which the mass ratio is 23/25/52 (R407C), and a mixture in which the mass ratio is 25/15/60 (R407E) are suitably used.

In mixtures of pentafluoroethane (R125), 1,1,1,2-tetrafluoroethane (R134a), and 1,1,1-trifluoroethane (R143a), the mass ratio (R125/R134a/R143a) may be, for example, 35 to 55/1 to 15/40 to 60. Among the mixtures, a mixture in which the mass ratio (R125/R134a/R143a) is 44/4/52 (R404A) is suitably used.

The unsaturated hydrofluorocarbon (HFO) refrigerant is preferably a fluoropropene having 3 to 5 fluorine atoms, more preferably one fluoropropene selected from 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf) or a mixture of two or more selected from these fluoropropenes, and even more preferably one fluoropropene selected from HFO-1225ye, HFO-1234ze, and HFO-1234yf or a mixture of two or more selected from these fluoropropenes.

The hydrocarbon refrigerant is preferably a hydrocarbon having 1 to 5 carbon atoms; specifically, the hydrocarbon refrigerant is, for example, methane, ethylene, ethane, propylene, propane (R290), cyclopropane, normal butane, isobutane, cyclobutane, methylcyclopropane, 2-methylbutane, normal pentane, or a mixture of two or more of these hydrocarbons. The hydrocarbon refrigerant is preferably a hydrocarbon which is a gas at 25° C. and 1 atmosphere among the above hydrocarbons and more preferably propane, normal butane, isobutane, 2-methylbutane, or a mixture of these hydrocarbons.

The refrigerant may be a refrigerant comprising the above-described refrigerant alone or may be a refrigerant further comprising another refrigerant in addition to the above-described refrigerant. Examples of the other refrigerant include other saturated hydrofluorocarbon refrigerants, fluorinated ether refrigerants such as perfluoroether, bis(trifluoromethyl)sulfide refrigerants, trifluoroiodomethane refrigerants, and natural refrigerants such as ammonia.

Examples of the other saturated hydrofluorocarbon refrigerants include saturated hydrofluorocarbons having 1 to 3, preferably 1 or 2, carbon atoms, and specific examples include pentafluoroethane (R125), 1,1,2,2-tetrafluoroethane (R134), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc).

The content of the refrigerating machine oil in the working fluid composition for a refrigerating machine is not particularly limited and is preferably 1 part by mass or more and more preferably 2 parts by mass or more and is preferably 500 parts by mass or less and more preferably 400 parts by mass or less, relative to 100 parts by mass of the refrigerant.

The refrigerating machine oil and the working fluid composition for a refrigerating machine are suitably used, for example, in air conditioners having a hermetic reciprocating or rotary compressor, in cold storage chambers, in open-type or hermetic-type automobile air conditioners, in dehumidifiers, in water heaters, in freezing chambers, in refrigerated warehouses, in automatic vending machines, in showcases, in cooling apparatuses of chemical plants, and in apparatuses including a centrifugal compressor.

EXAMPLES

Hereinafter, the present invention will be more specifically described based on Examples; however, the present invention is not limited to the Examples given below.

Hydrogenated polyacrylates and non-hydrogenated polyacrylates listed in Tables 1 and 2 were synthesized by using a method similar to that of Example 1 described in Japanese Unexamined Patent Publication No. 2016-098284 with adjustment of the types and proportions of monomers. The polyacrylates shown as being "Not hydrogenated" are polyacrylates which were yet to be subjected to hydrogenation process but from which as much of a low-boiling component other than the polymer and a catalyst as possible were removed as with the hydrogenated polyacrylates. These polyacrylates were used as base oils to prepare refrigerating machine oils each from any of the base oils. In Tables 1 and 2, EA denotes ethyl acrylate and BA denotes n-butyl acrylate. In Tables 1 and 2, the properties of the hydrogenated and non-hydrogenated polyacrylates (base oils) are also shown.

For the refrigerating machine oils of Example 1 and Comparative Example 1, Compatibility Tests 1 to 4 described below were conducted. The results are shown in Table 1. For the refrigerating machine oils of Example 2 and Comparative Example 2, Compatibility Tests 1 and 5 to 8 described below were conducted. The results are shown in Table 2.

Compatibility Test 1

The refrigerating machine oil and a difluoromethane/pentafluoroethane mixed refrigerant (mass ratio: 50/50, R410A) were mixed in a mass ratio of 15/85 (refrigerating machine oil/refrigerant) to prepare a working fluid composition according to "Testing method of compatibility with refrigerant" in JIS K 2211:2009 "Refrigerating machines oils". This working fluid composition was gradually cooled from 20° C., and the temperature at which the working fluid composition became phase-separated or whitened was determined as a two-layer separation temperature. In Table 1, "<−70" means that neither phase separation nor whitening was observed even upon cooling to −70° C., and ">+20" means that the refrigerant oil and refrigerant were not compatible in a temperature region from +20° C. to −70° C. and that the low-temperature-side two-layer separation temperature was higher than +20° C.

Compatibility Test 2

The two-layer separation temperature was evaluated in the same manner as in Compatibility Test 1, except that the refrigerant was changed to a difluoromethane/pentafluoroethane/1,1,1,2-tetrafluoroethane mixed refrigerant (mass ratio: 23/25/52, R407C).

Compatibility Test 3

The two-layer separation temperature was evaluated in the same manner as in Compatibility Test 1, except that the refrigerant was changed to a refrigerant containing only 2,3,3,3-tetrafluoropropene (HFO-1234yf).

Compatibility Test 4

The two-layer separation temperature was evaluated in the same manner as in Compatibility Test 1, except that the refrigerant was changed to a refrigerant containing only propane (R290) and that the mass ratio between the refrigerating machine oil and the refrigerant (refrigerating machine oil/refrigerant) was changed to 30/70.

Compatibility Test 5

The two-layer separation temperature was evaluated in the same manner as in Compatibility Test 1, except that the refrigerant was changed to a refrigerant containing only difluoromethane (R32).

Compatibility Test 6

The two-layer separation temperature was evaluated in the same manner as in Compatibility Test 1, except that the refrigerant was changed to a pentafluoroethane/1,1,1,2-tetrafluoroethane/1,1,1-trifluoroethanedifluoromethane mixed refrigerant (mass ratio: 44/4/52, R404A) and that the mass ratio between the refrigerating machine oil and the refrigerant (refrigerating machine oil/refrigerant) was changed to 10/90. The two-layer separation temperature on the high temperature side was also measured where necessary, because in some cases the working fluid composition was phase-separated or whitened at around 20° C. For example, in Table 2, "−60 to +11" means that the low-temperature-side two-layer separation temperature was −60° C. while the high-temperature-side two-layer separation temperature was +11° C., and that the temperature region above −60° C. and below +11° C. was a temperature region where the refrigerating machine oil and the refrigerant were compatible. In Table 2, "<−70 to >+20" means that neither phase separation nor whitening was observed in the temperature region from −70° C. to +20° C., namely, that the entirety of this temperature region was a temperature region where the refrigerating machine oil and the refrigerant were compatible.

Compatibility Test 7

The two-layer separation temperature was evaluated in the same manner as in Compatibility Test 6, except that the refrigerant was changed to a difluoromethane/pentafluoroethane/1,1,1,2-tetrafluoroethane mixed refrigerant (mass ratio: 23/25/52, R407C).

Compatibility Test 8

The two-layer separation temperature was evaluated in the same manner as in Compatibility Test 6, except that the refrigerant was changed to a refrigerant containing only 2,3,3,3-tetrafluoropropene (HFO-1234yf).

TABLE 1

| | | Example 1 | Comparative Example 1 |
|---|---|---|---|
| Hydrogenated or non-hydrogenated polyacrylate | Type of monomer | BA | BA |
| | Molar proportion of monomer (mol %) | 100 | 100 |
| | Average degree of polymerization | 7.3 | 7.3 |
| | Whether or not hydrogenated | Hydrogenated | Not hydrogenated |
| | Content of terminal double bond-containing unit (mol %) | <0.01 | 8.3 |
| | Amount of remaining monomer (mass %) | <0.01 | <0.01 |
| | Kinematic viscosity (mm$^2$/s) 40° C. | 82.0 | 81.3 |
| | 100° C. | 11.5 | 11.3 |
| | Viscosity index | 130 | 129 |
| Compatibility test 1 | Two-layer separation temperature (° C.) | −27 | −23 |
| Compatibility test 2 | | −44 | +12 |
| Compatibility test 3 | | <−70 | −20 |
| Compatibility test 4 | | −11 | >+20 |

TABLE 2

| | | Example 2 | Comparative Example 2 |
|---|---|---|---|
| Hydrogenated or non-hydrogenated polyacrylate | Type of monomer | EA/BA | EA/BA |
| | Molar proportion of monomer (mol %) | 67/33 | 67/33 |
| | Average degree of polymerization | 7.4 | 7.6 |
| | Whether or not hydrogenated | Hydrogenated | Not hydrogenated |
| | Content of terminal double bond-containing unit (mol %) | <0.01 | 11.0 |
| | Amount of remaining monomer (mass %) | <0.01 | <0.01 |
| | Kinematic viscosity (mm$^2$/s) 40° C. | 132.9 | 137.5 |
| | 100° C. | 13.8 | 13.8 |
| | Viscosity index | 99 | 97 |
| Compatibility test 1 | Two-layer separation temperature (° C.) | <−70 | — |
| Compatibility test 5 | | −60 | −52 |
| Compatibility test 6 | Low-temperature-side two-layer separation temperature to high-temperature-side two-layer separation temperature (° C.) | <−60~>+20 | <−60~+11 |
| Compatibility test 7 | | <−60~>+20 | — |
| Compatibility test 8 | | <−60~>+20 | <−60~−34 |

In Example 3, a hydrogenated polyacrylate in which the proportion of ethyl acrylate (EA) was 100% by mole (average degree of polymerization: 8.1, content of terminal double bond-containing unit: <0.01% by mole, amount of remaining monomer: <0.01% by mass, kinematic viscosity at 40° C.: 260.2 mm$^2$/s, kinematic viscosity at 100° C.: 19.4 mm$^2$/s, and viscosity index: 84) was synthesized in the same manner as above. This hydrogenated polyacrylate was used as a base oil to prepare a refrigerating machine oil from this base oil. Compatibility Test 1 was conducted on the refrigerating machine oil of Example 3, and the two-layer separation temperature was determined to be <−70° C.

In Example 4, the hydrogenated polyacrylate of Example 1 described above and the non-hydrogenated polyacrylate of Comparative Example 1, which corresponds to the polyacrylate of Example 1 yet to be subjected to hydrogenation, were mixed in a ratio of 3:7 (mass ratio) to obtain a polyacrylate in which the content of the terminal double bond-containing unit was 5.8% by mole. This polyacrylate was used as a base oil to prepare a refrigerating machine oil from this base oil. Compatibility Test 3 was conducted on the refrigerating machine oil of Example 4, and it was confirmed that the refrigerant compatibility was improved over that achieved when the non-hydrogenated polyacrylate of Comparative Example 1 was used.

In Example 5, the hydrogenated polyacrylate of Example 2 described above and the non-hydrogenated polyacrylate of Comparative Example 2, which corresponds to the polyacrylate of Example 2 yet to be subjected to hydrogenation, were mixed in a ratio of 5:5 (mass ratio) to obtain a polyacrylate in which the content of the terminal double bond-containing unit was 5.5% by mole. This polyacrylate was used as a base oil to prepare a refrigerating machine oil consisting of this base oil. Compatibility Test 8 was conducted on the refrigerating machine oil of Example 5, and it was confirmed that the refrigerant. compatibility was improved over that achieved when the non-hydrogenated polyacrylate of Comparative Example 2 was used.

The invention claimed is:

1. A working fluid composition for a refrigerating machine, comprising:
    a refrigerating machine oil comprising
        a base oil,
            wherein the base oil comprises
                poly(meth)acrylate comprised of a hydrogenated poly(meth)acrylate, a content of a unit having a carbon-carbon double bond present at a terminal in the poly(meth)acrylate is 6% by mole or less relative to total units constituting the poly(meth)acrylate, and a kinematic viscosity at 40° C. of the hydrogenated poly(meth)acrylate is 1 to 1000 mm$^2$/s, wherein an amount of the hydrogenated poly(meth)acrylate is 30% by mass or less based on the total amount of the poly(meth)acrylate, and
            an oil other than the hydrogenated poly(meth)acrylate; and
    a refrigerant comprising a refrigerant selected from the group consisting of
        a mixture of difluoromethane, pentafluoroethane, and 1,1,1,2-tetrafluoroethane,
        an unsaturated hydrofluorocarbon, and
        a hydrocarbon,
wherein
    a mass ratio of the refrigerating machine oil/the refrigerant is from 2/100 to 400/100, a content of the base oil is 80% by mass or more, based on the total amount of the refrigerating machine oil, and the hydrogenated poly(meth)acrylate has a structural unit represented by the following formula (1):

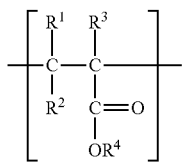

(1)

wherein $R^1$, $R^2$, and $R^3$ represent a hydrogen atom or a hydrocarbon group, and $R^4$ is an alkyl group having 1 to 4 carbon atoms.

2. The working fluid composition for a refrigerating machine according to claim 1, wherein the refrigerant comprises a mixture of difluoromethane, pentafluoroethane, and 1,1,1,2-tetrafluoroethane.

3. The working fluid composition for a refrigerating machine according to claim 1, wherein the refrigerant comprises an unsaturated hydrofluorocarbon.

4. The working fluid composition for a refrigerating machine according to claim 1, wherein the hydrocarbon group represented by $R^4$ in the formula (1) is an alkyl group having 2 carbon atoms.

5. The working fluid composition for a refrigerating machine according to claim 1, wherein $R^1$ and $R^2$ in the formula (1) each are a hydrogen atom and $R^3$ in the formula (1) is a hydrogen atom or a methyl group.

6. The working fluid composition for a refrigerating machine according to claim 1, wherein the average degree of polymerization of the hydrogenated poly(meth)acrylate is 3 to 20.

7. The working fluid composition for a refrigerating machine according to claim 3, wherein the unsaturated hydrofluorocarbon is selected from the group consisting of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf).

8. The working fluid composition for a refrigerating machine according to claim 1, wherein the refrigerant comprises a hydrocarbon selected from the group consisting of methane, ethylene, ethane, propylene, propane (R290), cyclopropane, normal butane, isobutane, cyclobutane, methylcyclopropane, 2-methylbutane, and normal pentane.

9. The working fluid composition for a refrigerating machine according to claim 1, wherein a mass ratio of the refrigerating machine oil/the refrigerant is from 2/100 to 30/70.

10. The working fluid composition for a refrigerating machine according to claim 1, wherein a mass ratio of the refrigerating machine oil/the refrigerant is from 10/90 to 30/70.

11. A method for improving a compatibility of a working fluid composition for a refrigerating machine comprising,
(a) preparing a refrigerating machine oil comprising a base oil consisting of a poly(meth)acrylate, and
(b) mixing a refrigerant and the refrigerating machine oil, wherein the poly(meth)acrylate has a structural unit represented by the following formula

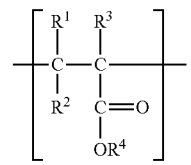

(1)

wherein $R^1$ and $R^2$ each are a hydrogen atom and $R^3$ be a hydrogen atom or a methyl group, and $R^4$ is an alkyl group having 1 to 10 carbons, and a content of a unit having a carbon-carbon double bond present at a terminal in the poly(meth)acrylate is 6% by mole or less relative to total units constituting the poly(meth)acrylate;

an amount of the hydrogenated poly(meth)acrylate is 30% by mass or less based on the total amount of the poly(meth)acrylate; and the refrigerant comprises at least one refrigerant selected from the group consisting of a mixture of difluoromethane, pentafluoroethane, and 1,1,1,2-tetrafluoroethane, a mixture of pentafluoroethane, 1,1,1,2-tetrafluoroethane, and 1,1,1-trifluoroethane, an unsaturated hydrofluorocarbon, and a hydrocarbon.

12. The method for improving a compatibility of a working fluid composition for a refrigerating machine according to claim 11, wherein the refrigerant comprising a refrigerant selected from the group consisting of a mixture of difluoromethane, pentafluoroethane, and 1,1,1,2-tetrafluoroethane, an unsaturated hydrofluorocarbon, and a hydrocarbon;

the unsaturated hydrofluorocarbon is selected from the group consisting of 1,3,3,3-tetrafluoropropene (HFO-1234ze), and 2,3,3,3-tetrafluoropropene (HFO-1234yf), 1,2,3,3-tetrafluoropropene (HFO-1234ye); and the hydrocarbon is selected from the group consisting of propane (R290), normal butane, isobutane, and 2-methylbutane.

13. The method for improving a compatibility of a working fluid composition for a refrigerating machine according to claim 11, wherein a mass ratio of the refrigerating machine oil/the refrigerant is from 2/100 to 30/70.

14. A working fluid composition for a refrigerating machine, comprising
a refrigerant; and
a refrigerating machine oil comprising a base oil consisting of a poly(meth)acrylate,
wherein the refrigerant comprising a refrigerant selected from the group consisting of
a mixture of difluoromethane, pentafluoroethane, and 1,1,1,2-tetrafluoroethane,
an unsaturated hydrofluorocarbon, and
a hydrocarbon,
the unsaturated hydrofluorocarbon is selected from the group consisting of 1,3,3,3-tetrafluoropropene (HFO-1234ze), and 2,3,3,3-tetrafluoropropene (HFO-1234yf), 1,2,3,3-tetrafluoropropene (HFO-1234ye), and
the hydrocarbon is selected from the group consisting of propane (R290), normal butane, isobutane, and 2-methylbutane,
a mass ratio of the refrigerating machine oil/the refrigerant is from 2/100 to 400/100; and the poly(meth)acrylate has a structural unit represented by the following formula (1):

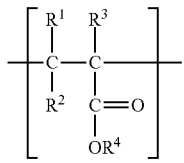 (1)

wherein $R^1$ and $R^2$ each are a hydrogen atom and $R^3$ be a hydrogen atom or a methyl group, and $R^4$ is an alkyl group having 1 to 10 carbons, the poly(meth)acrylate contains a hydrogenated poly(meth)acrylate, and a content of a unit having a carbon-carbon double bond present at a terminal in the poly(meth)acrylate is greater than 1% by mole and 6% by mole or less relative to total units constituting the poly(meth)acrylate.

15. The working fluid composition for a refrigerating machine according to claim 14, wherein a mass ratio of the refrigerating machine oil/the refrigerant is from 2/100 to 30/70.

16. The working fluid composition for a refrigerating machine according to claim 14, wherein a mass ratio of the refrigerating machine oil/the refrigerant is from 10/90 to 30/70.

17. The working fluid composition for a refrigerating machine according to claim 14, wherein $R^4$ in the formula (1) is an alkyl group having 1 to 4 carbons.

18. The working fluid composition for a refrigerating machine according to claim 14, wherein an amount of the hydrogenated poly(meth)acrylate is 30% by mass or more based on the total amount of the refrigerating machine oil.

19. The working fluid composition for a refrigerating machine according to claim 14, wherein an amount of the hydrogenated poly(meth)acrylate is 30% by mass or less based on the total amount of the poly(meth)acrylate.

* * * * *